Jan. 12, 1954  C. SMITH  2,665,775
MECHANIZED MERCHANDISING SYSTEM
Filed March 25, 1950  4 Sheets-Sheet 1
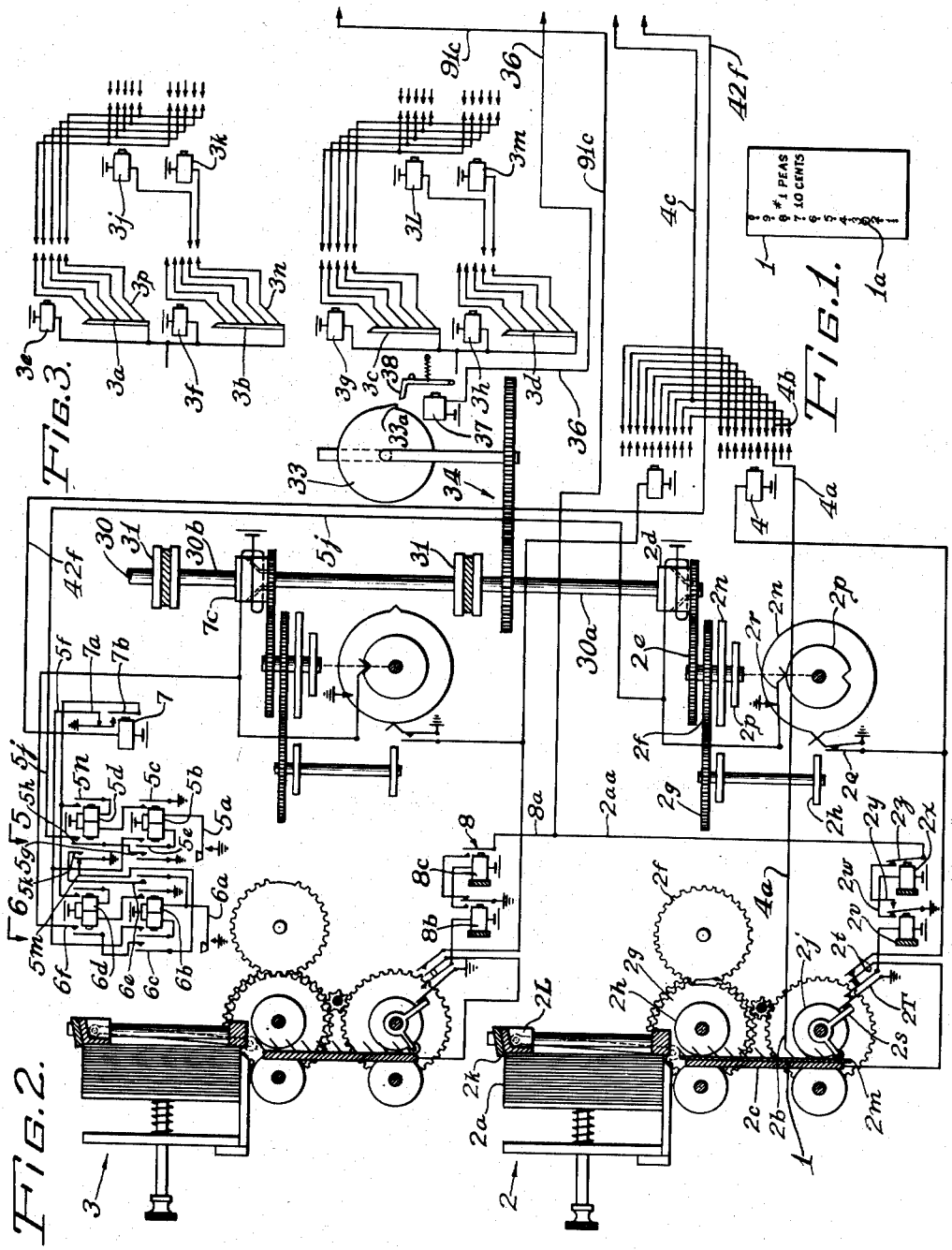
Inventor:
Clyde Smith
By [signature], Atty.

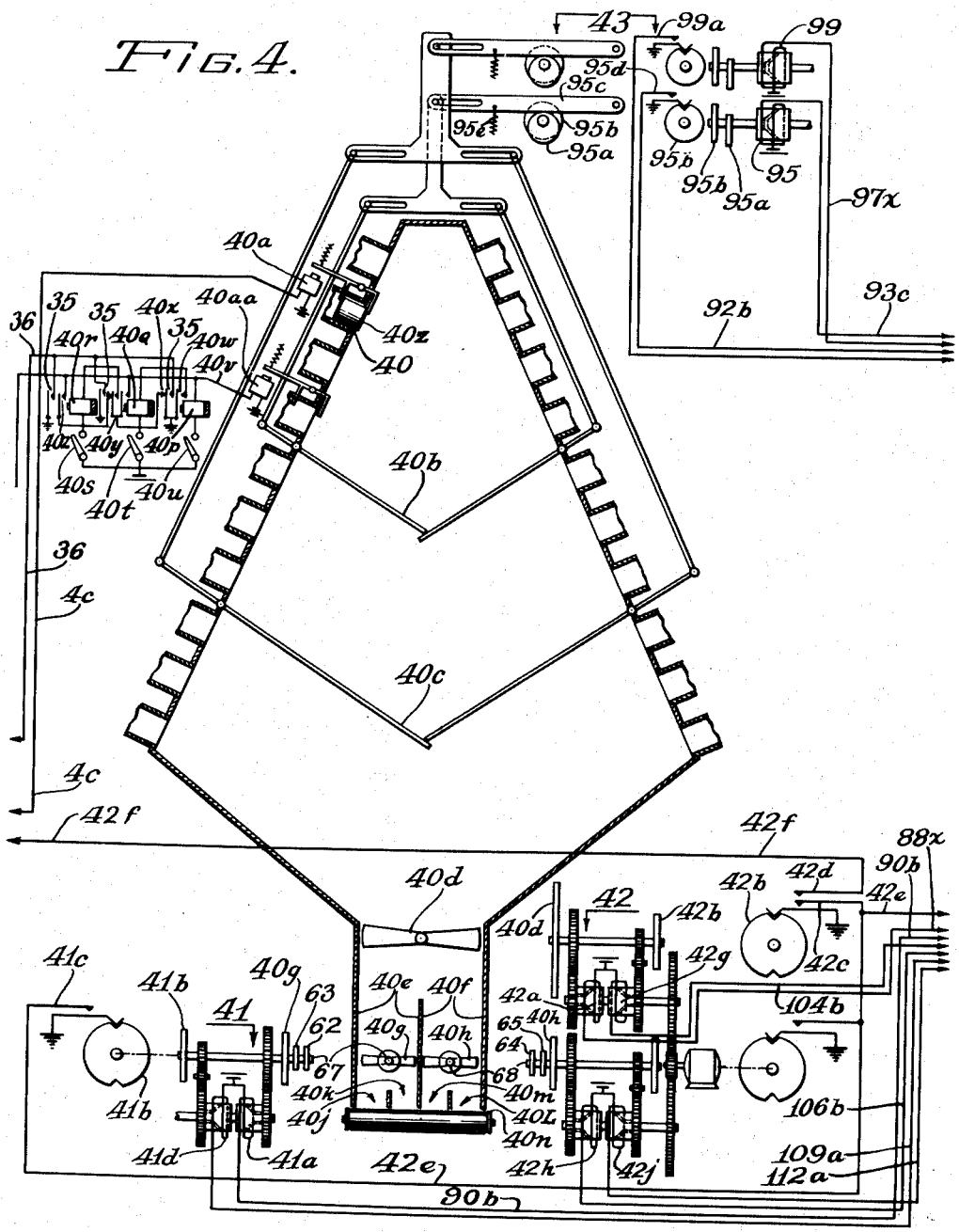

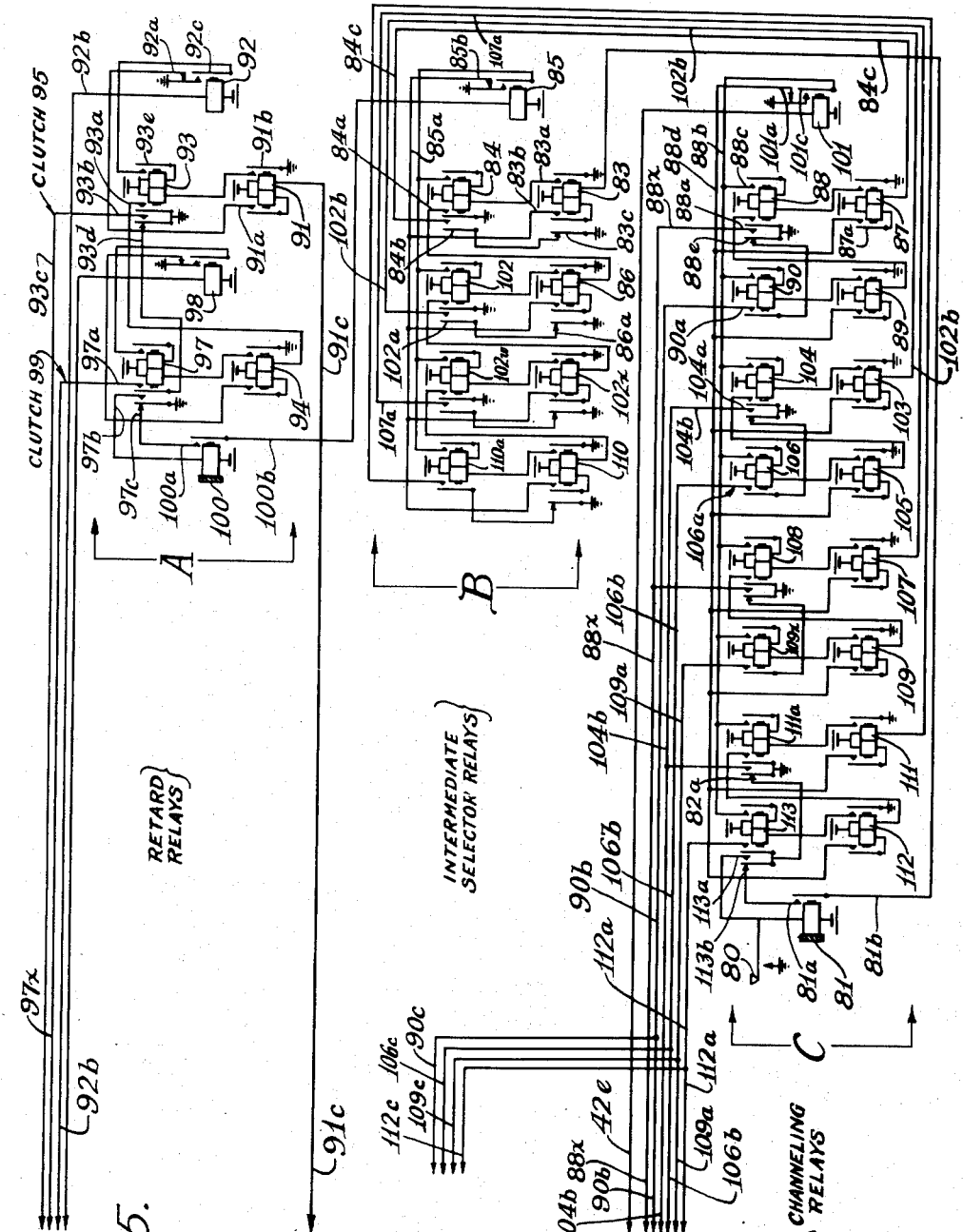

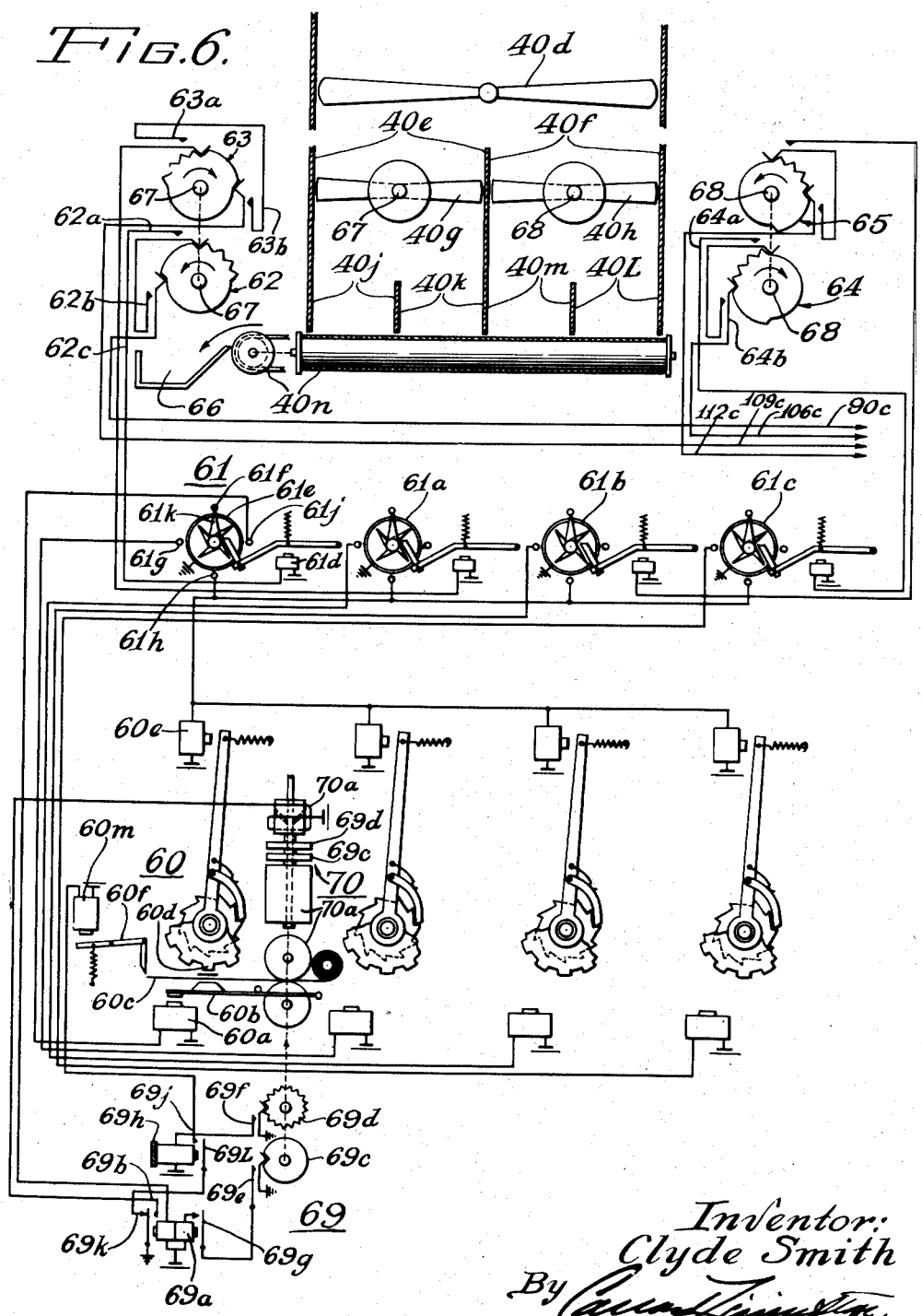

Patented Jan. 12, 1954

2,665,775

UNITED STATES PATENT OFFICE 2,665,775

MECHANIZED MERCHANDISING SYSTEM

Clyde Smith, Hopkinsville, Ky.

Application March 25, 1950, Serial No. 151,845

36 Claims. (Cl. 186—1)

This invention has as its principal object the provision of improvements in mechanized merchandising systems, and involves apparatus for automatically releasing and conveying to a central delivery point various kinds of packaged merchandise by mechanism operating under the control of perforated cards or the like selected by the customers in lieu of the actual items desired.

In the preferred embodiment of this system, a sample of each kind of merchandise sold is displayed on glass-enclosed shelves in order that the customer may make a visual selection of the goods he wishes to purchase.

Adjacent each displayed article is a supply of corresponding order cards or tickets which are perforated (as well as legibly imprinted) with the price and identification or stock number of the item; these cards are withdrawn by the customers instead of the displayed items which they represent and are ultimately handed to an attendant who places them into a card feed and sensing device which automatically sets in motion apparatus for delivering the desired merchandise at a central distributing counter.

Among the important objects of the invention are: the provision of mechanism and control means for effecting speedy merchandise delivery by means of a plurality of card feeds operable individually or in sequence; the provision of a plurality of conveying channels and means for selectively distributing the card-released goods thereto to permit a steady flow of merchandise and delivery of several orders in an overlap manner; the provisions of automatic control means for effecting cyclic order handling operations, such that delivery of succeeding orders to a predetermined channel will occur when a preceding order has progressed to an intermediate point; the provision of mechanism for releasing a plurality of articles, packages, or units of any given kind of merchandise from a single card without the aid of special card perforations in order to facilitate the sale of items priced fractionally, e. g. two articles of the same kind for 25 cents or three articles for 50 cents, and so-on; together with detailed objects in the arrangements of components and circuit connections for effectuating the foregoing objects, among others, in a relatively simplified and economically operated and maintained system of this class.

Additional objects relate to the provision of simplified means for identifying each order by a claim ticket automatically imprinted during each transaction with an identification number, the said tickets being delivered to the distributing or wrapping counter along with the goods.

The system contemplates the release and feeding of merchandise from the supply or stock bins by gravity onto a conveying line, and it is accordingly still another important object to expand the stock capacity of such a system by elevating the storage facilities and automatically and intermittently retarding the descent of the goods to the conveyor to prevent injury thereto, thus, in effect, shortening the conveyor travel otherwise necessary for an equivalent stock capacity not stored at the elevations permitted by the aforesaid retarding means.

Ancillary to the last-named object is an arrangement whereby the goods-retarding mechanism is actuated positively in timed relation to the occurrence of certain goods-releasing and delivering operations with the further object of affording an orderly flow of goods relative to the conveying means.

Viewed from another aspect, the improvements afforded by the present disclosures relate to the provision in a card-controlled merchandise dispensing machine of an elongated conveyor subdivided into a plurality of channels, a plurality of baffles for releasing and directing card-released goods into certain channels, a system of channeling relay circuits under control of a master goods-release circuit, a card feed and selector brushes for setting up goods-release circuits corresponding to the card perforations, preset multiplier sub-circuits for causing release of a plurality of articles of one kind from a single card without special perforations to indicate the number of articles to be released; and means for sensing the card once, advancing the card to a non-sensing position, holding the card in the non-sensing position a length of time corresponding to the settings of the multiplier circuits, and emitting the card at the conclusion of the last article releasing operation.

Additionally, the system provides for selective or tandem automatic operation of the card feeds, seriatim, such that the operator may cause operation of a desired card feed or sensing unit, or may set the apparatus for automatic sequential operation of a desired number of card feeding and sensing units.

Additional objects and aspects of utility and novelty pertain to details of the construction and operation of the embodiment described hereinafter in view of the annexed drawings, in which:

Fig. 1 shows a front plan view of a card having a single row of spaces for perforations, lettered from 1 to 0, for selecting articles on a one-digit basis;

Fig. 2 shows a side elevation, partly in section, of two card-feeds, and circuit connections and apparatus for controlling the operation of the card feeds and selector relays for setting up circuits through perforations in the cards to energize, for each perforation, a magnet to release one article of merchandise in correspondence with the perforation in the card;

Fig. 3 is a circuit diagram of the relay selector means for selecting a particular item of merchandise on a two-digit basis;

Fig. 4 is a front view of a storage rack, partly in section, with tubes for the storage of merchandise, circuit means for releasing a plurality of articles of the same kind of merchandise, apparatus for controlling the downward movement of merchandise, means for distributing the merchandise to a plurality of channels, and a conveyor belt to convey the merchandise to a central point;

Fig. 5 is a circuit diagram of certain selecting and sequence control circuits;

Fig. 6 is a fragmentary vertical section, to enlarged scale, of the release and conveying means shown in the lower part of Fig. 4, together with circuit means for printing on a ticket the number of each transaction.

Introductory statement of operation

Articles of merchandise 40z (Fig. 4) are stored in gravity-feed stock bins, to be released by electromagnetic release means 40a.

The customer selects a perforated order card (Fig. 1) from a compartment adjacent the glass-enclosed sample display shelf (not shown) for each stock bin.

An attendant places all such order cards in an automatic feed 2 or 1 (Fig. 2) and presses control keys 5a, 6a, with the result that the cards of one feed are fed successively into sensing position, and circuits are set up to energize the goods-release means (40a, Fig. 4), whereupon the released article gravitates onto the first retarding baffle 40b.

Subsequently, clutch means 95—99 (Fig. 4) actuates the several retarding baffles 40b, 40c, in succession, to release any detained goods for descent to the first selector baffle 40d.

The first selector baffle means 40d will then be caused to release any retained goods selectively into one or the other of the several conveyor channels 40e or 40f, depending on the channeling selected by control circuits set up in each operating cycle.

Thereafter, secondary selector baffle means 40g or 40h will deposit the goods into conveyor channels 40j, 40k, 40L, 40m, etc., in accordance with a predetermined sequence plan for regulating the flow of merchandise to the point of delivery 66 (Fig. 6) on conveyor belt means 40n.

As an incident to the operation of the last selector baffle means (e. g. 40g, Fig. 6) an order identification ticket is imprinted and deposited in the same conveying channel with the goods by the mechanism 60—69—70 of Fig. 6.

The circuit and control means for the system is so arranged that a plurality of card feeds are employed and may be operated independently or in sequence with a selective distribution of the goods to the several delivery channels.

DETAILED OPERATION

Initial conditioning

At the beginning of the day's business an initial cycling or clearing operation may be effected by closing the key switch 80 (Fig. 5) to energize relay 81 and ground contact 81a through the normal contacts 82a, whereby conductor 81b is grounded, energizing relay 83 which grounds contact 83a, energizing relay 84. Relay 83, energized, locks up through contact 83b, conductor 85a and contact 85b. Relay 84, energized, grounds contact 84a which energizes relay 86; other relays in this group energize one by one in a chain manner. Each pair through contacts 84a, when relay 83 is energized, and contact 84b, when relay 84 is energized, controls the energization of two sets of relays 87—88, 89—90, which in turn controls one cycle of operation of members 40d and 40g (Figure 6), following the operation of baffle plates 40b and 40c.

In the operation of the system, prepared order cards such as shown in Fig. 1 are perforated, as well as legibly imprinted, with the item number of the article and its price; and these order cards are available in receptacles positioned adjacent the corresponding sample displays of each kind of merchandise, the customer withdrawing one card for each article desired.

The order card depicted in Fig. 1 is perforated at 1a with the stock number of an article. After withdrawal by the cutomer, the cards are handed to an attendant, for example the cashier, who places them in a card-feed receptacle 2a. In Fig. 2 there are shown side views of two motor-driven card feeds generally denoted at 2 and 3; these feeds are conventional and serve to feed the cards downwardly, one at a time, into sensing position. Each of the two card feeds has 10 brushes 2b (one brush for each digital position from 1 to 0); and each feed has a grounding plate 2c; which is momentarily grounded when a card reaches the sensing position therein.

When an order card is in the sensing position shown in Fig. 2 it pauses momentarily and, plate 2c being grounded, a circuit is established through the perforations from brush 2b to conductor 4a. Transfer relay 4 is energized and at the same time closes a circuit at 4b to complete the circuit to release magnet 40a (Fig. 4) energizing the latter and causing the selected article of merchandise 40z to be released and fall downward to the baffles, and ultimately to the distributing and conveying means shown in Figs. 4 and 6.

Referring to Fig. 2, the two card feeds are arranged to operate one at a time, each under control of a pair of relays 5 and 6. Operation of the card feeds is initiated by keys 5a and 6a. Both feeds may be filled with cards at the same time; if both feeds are thus filled, keys 5a and 6a are both pressed, but feed 2 is the first to take motion and, when emptied, feed 3 then automatically takes motion. During the feeding of cards from feed 3, feed 2 may again be loaded. However, if only one feed is loaded, the key corresponding to that feed is to be pressed by the attendant.

Fig. 3 shows fragmentary schematic views of the relay selector system using two digits as a selecting basis, instead of the single digit arrangement shown in Fig. 2. Elements 3a, 3b, 3c, and 3d represent grounding bars and associated brushes—bars 3d and 3b representing the tens digits and 3c and 3a the units digits for their respective card feeds. Relays and grounding bars, such as 3e, 3f, 3g, and 3h, are energized in the same manner as transfer relay 4 of Fig. 2, and prevent cross circuits between brushes of the two different card feeds, as well as serving to transfer the circuits set up through the perforations in the card to the release magnets for releasing merchandise.

Relays 3j, 3k, 3L, and 3m are the tens relays, one for each tens brush of the two card feeds, and these are energized from their respective brushes, such as 3n for relay 3k, through the perforation in the card. For the units, the circuit is a brush, such as 3p, to a corresponding contact in the energized tens relay, through to a particular merchandise release magnet corresponding to the control perforations in the order card.

As depicted in Fig. 4, the merchandise is arranged in storage racks or tubes 40, in position to gravitate one article at a time therefrom toward the conveying means, responsive to operation of any corresponding release means or magnet 40a and its associated release escapement, in response to a perforation in a card. Members 40b and 40c are baffle plates in pairs, operated one pair at a time to retard the downward movement of the merchandise from the higher levels. Plates 40b are the first to operate, followed by 40c.

Multiple unit relays 40p, 40q, and 40r operate to release a plurality of articles of the same kind; the number of articles released in excess of one will be determined by the settings of the several multiplier switches 40s, 40t, 40u, etc., and accordingly, one or a plurality of merchandise articles may be delivered from a single card without special perforations.

The structure for the goods storage compartments is of sufficient extent in lengthwise sense to provide space for all items of merchandise to be handled by the system; and its capacity is enlarged by a vertical extension of the storage racks made possible by the novel automatic retarding-baffles. When released from said compartments merchandise is first deposited on baffle plates 40b, 40c, or member 40d (Figs. 4, 5, 6); member 40d rotates one-half revolution clockwise, or counter-clockwise, as determined by the directing control relays 87, 103, 107, 111, and their mates, at C of Fig. 5. The movements of baffle 40d, for example, directs the merchandise either to compartment 40e or 40f, where it falls on member 40g or 40h, either of which can be selectively displaced one-half revolution, clockwise or counter-clockwise, as determined by the direction control relays 89, 105, 109, 112, and their mates at C of Fig. 5.

In the illustration four selecting channels for the reception of the merchandise are provided: channels 40j, 40k for such merchandise as may be deposited by member 40g; and channels 40L, 40m, for items from member 40h. The merchandise is finally deposited on a motor driven conveyor belt 40n, which carries all articles forward to receiving stations at a central delivery point 66, there being one such station for each of the four channels shown in Fig. 6.

Channel selection

Generally denoted at 41 and 42 (Fig. 4) is shown the mechanism for directing the movements of lower or selecting baffles 40g, 40h, and 40d. These mechanisms are motor-driven, and turn the said baffle means 40d, 40g, and 40h, clockwise or counter-clockwise, by means of a conventional magnetic clutch 41a.

Generally denoted at 43 is the mechanism for opening and closing the baffle plates, operation of which will be described hereinafter.

Fig. 5 shows the master control means, including relays and circuit connections for controlling the operation of the several sub-mechanisms in a predetermined order.

At A are the relays for controlling the operation of the retarding baffle plates 40b, 40c, which are the first of the several devices to operate after the merchandise has been released.

In Fig. 5, at B, are shown relays for energizing the relays at C. These relays are chain-energized at the beginning of the day's business by the operation of key 80 (left, group C), and are also automatically reenergized at the end of each round of operations by relay 81. These B relays, when energized as before described, de-energize pair-by-pair under control of master relay 85 (right, group B), and each pair of group B relays controls the energization of two pairs of group C relays. Once energized, the relays of both groups B and C are released pair-by-pair by the movements of the baffle plates. Following the final movement of the baffle plates the latter set-up circuits to energize the relays of group C.

Each pair of relays of group C controls and directs the movement of selector baffle members, such as 40d, 40g, and 40h (Fig. 4), to deposit the merchandise in one of the several delivery channels in a predetermined order.

A pair of C relays, for example, 87, 88, controls the movement of member 40d (Fig. 4) in a counter-clockwise direction; relays 89, 90, control the movement of member 40g in a like direction, and so-on, until each of the four delivery channels has been served with merchandise. The relays are then automatically reset for another round of operation.

Relays 89, 90, in addition to controlling the movement of member 40g (Figs. 4 and 6), set up circuits through contact 90a, conductor 90c, 90c (Fig. 6) contacts 62b, 62a, to operate the stepping magnet 61d (Fig. 6), on the counter-clockwise movement of cam 62. Relays 105, 106, set up circuits through contact 106a, conductor 106c, 106c (Fig. 6) contacts 64b, 64a and sets up a like circuit on the clockwise movement of cam 64, to operate its associated stepping magnet.

Relays 109, 109x, through conductor 109c, set up circuits on the clockwise movement of cam 63, and relays 112, 113, through conductor 112c set up circuits on the counter clockwise movement of cam 65 for operating their associated stepping magnets.

In general, the group A relays may be regarded as the retard-baffle control means, while the relays of group B are intermediate selector relays; the group C relays constituting the channeling relays involved in actuation of the selector baffles for channeling the released goods.

Identification-ticket mechanism

Fig. 6 shows a partial view of the lower portion of the system shown in Fig. 4 for delivering the merchandise, which has been released in response to punched cards, to a central receiving point 66, one of four such points. Also shown are means for indicating on a tape the number of each transaction and means for controlling the numbering system.

In the illustrative example, there are four numbering machines of the type generally indicated at 60, one for each of the four delivery channels herein provided; each said machine including a roll of paper, printing mechanism, and paper cut-off means. On the paper web is imprinted the identification number of each transaction and, when numbered and cut off, the paper ticket drops into the particular delivery channel 66 with which its printing mechanism is associated, to serve as a record, or order identification means.

All of the numbering machines move forward one digital step on each transaction; and in each case the machine to print will be that one associated with the delivery channel carrying the merchandise of the last transaction.

The numbering, printing, paper-feeding and cutting mechanisms are each under control of a stepping switch such as indicated at 61; these stepping switches are actuated by cams 62 for switch 61, 63 for 61a, 64 for 61b, 65 for 61c, etc. (Fig. 6), which in turn selectively operate an associated identification numbering machine, as aforesaid.

There is a cam switch for each stepping switch, and the several cams are mounted in pairs on one shaft, i. e., cams 62, 63 on shaft 67, cams 64, 65 on shaft 68, and are driven by motor means (not shown) and make a one-half revolution, clockwise or counter-clockwise, in a predetermined order, in unison with baffles 49g and 49h, under the selective control of the relays shown in Fig. 5. The cam switch lobes (of which there are four on each cam) and associated contacts 62a, 62b, etc. impulse the associated stepping switches 61, 61a, etc.; such that on each closure of contact 62a, for example, contact 62b is also closed, grounding from conductors 90c, 90b, and contact 90a of energized relay 90 (Fig. 5) contact 62a, energizing stepping magnet 61d, once for each cam lobe or tooth.

With shaft 67 in counter-clockwise motion (Fig. 6), cams 62 and 63 are also in motion; the movement of cam 63 is ineffective since contact 63b is open; thus, these and other cams are effective or ineffective, depending upon the direction of movement of the corresponding drive shafts, and the grounding of relay contacts as 90a (Fig. 5) for contact 62b of cam 62.

The stepping switches associated with each numbering machine are each provided with a conventional stepping mechanism, a contact ring 61e, four contacts 61f, 61g, 61h, and 61j, and wiper 61k, and the circuits established sequentially thereby control the printing of the number on the tape, cutting off the tape, and advancing the tape for the next printing operation.

Upon the first step of any such stepping switch 61, contact 61g is grounded, energizing magnet 60a, which attracts printing hammer 60b downwardly; upon deenergization of magnet 60a, hammer 60b springs upward, imprinting on the paper tape 60c the character represented at 60d, i. e. one of the ten digits, 1 to 0, which are arranged around the periphery of the type wheel.

Responsive to the second step of switch 61, contact 61h is grounded, energizing all of the magnets 60e; on the next step of switch 61 the several magnets 60e deenergize, advancing all of the numbering wheels one step to the next digit by means of the conventional ratchet mechanism shown.

Responsive to the third step of switch 61 contact 61j is grounded, energizing relay 69a, which sets in motion the motor driven paper-advancing mechanism generally denoted at 70, thus effecting advance of the paper one step. Upon completion of this operation the cut-off knife 69f cuts off the paper bearing the imprinted number. Wiper 61k of switch 61 now advances to its starting or normal position.

*Card sensing and merchandise selecting*

Upon pressing key 5a (Fig. 2) relay 5b is energized; contact 5c energizes relay 5d; relay 5b locks up through contact 5e, conductor 5f and contact 7a of relay 7.

Likewise, depressing key 6a energizes relay 6b, which in turn energizes relay 6d, as described for relay 5d. The action of relays 6b and 6d is the same as for relays 5b and 5d, except that relay 6b has an energizing circuit, so long as relay 5d is energized, through contacts 5k and 6e, which restrains operation of card feed No. 3 until the cards of feed 2 have become exhausted.

When relays 5b and 5d are energized contact 5g is closed, grounding contact 5h and conductor 5j, thereby energizing motor-driven clutch 2d, setting in motion the several gears 2e, 2f, 2g, also pressure rolls 2h. Through intermediate gearing card-feed pressure roll 2j also takes motion.

The picker blade 2k moves downward due to motion of arm 2L. The card 2m is also carried down between the grounding plate 2c and the several brushes 2b. The card is now in its sensing position; rocker arm 2s is raised, closing contacts 2t and 2T; contacts 2T energize slow-to-release relay 2v, which in turn energizes through contact 2w the slow-to-release relay 2x.

In this operation cams 2n and 2p also take motion, closing contact 2r, to insure a complete cycle of movement of the card feed, and to apply momentary ground to contacts 2q; the card feed pauses momentarily, contact 2q grounds contact 2t and plate 2c and through perforation 1a the brush 2b is grounded, grounding conductor 4a, and its corresponding contact.

Contacts 2q, closed, also energize relay 4, extending the selector circuit from 4a to 4b to conductor 4c, energizing magnet 40a (Fig. 4), releasing article 40z.

Slow-to-release relays 2v and 2x are for the purpose of momentarily grounding conductor 2aa. The feeding of the card (or cards) in this example is then complete; relay 2v then releases, grounding contact 2y, which in turn grounds 2z and conductor 2aa and 91c (Fig. 5), energizing relay 91 and its mates for the subsequent round of operation of the baffle plates. Relay 2x then releases.

In order to insure a correct count in the delivery of goods in cases where successive cards call for a plurality of identical items of merchandise in operations involving the multiplier subcircuit switches 40s, 40t, 40u, multiple-item card control or regulating means is provided in the card feed to first sense a card and thereafter to advance and hold the card at a non-sensing position for a measured length of time calculated to permit the delivery of the several articles of merchandise called for in the event the next card proves to be a duplicate of the preceding card, so that all items of like kind called for by a given order card, as indicated by the setting of the switches 40u, 40t, and 40s, may be discharged in a single sensing operation. This feature regulates the operating time for the card-sensing operation in direct proportion to the number of articles to be released, and prevents any possible errors in the number of items released which might otherwise occur in high speed operations of the card feed as a result of overlapping release impulses from duplicate cards following each other in rapid succession through the feed mechanism.

The aforesaid feed-regulating means, as shown in Fig. 2, includes slip-clutch 31 interposed between the driving and driven sides of the card feed drive shaft 30 for the several card feeds 2 and 3, etc.

A stop wheel 33 is driven through a suitable gear train 34 from each feed drive shaft section 30a or 30b (the stop disc for section 30b being omitted for simplicity).

Whenever any of the multiplier relays (40p, 40q, 40r) (Fig. 4) is energized as by closure of attendant-controlled multiplier switches 40s, 40t, or 40u, one of the subcircuit contacts 35, connected in common to conductor 36, will be grounded, thereby energizing stop coil 37 (Fig. 2) to attract stop pawl 38 into position for engagement by the stop lug 33a on disc 33, thereby arresting rotation of the associated clutch shaft section 30a (or 30b) notwithstanding that the corresponding magnetic clutch 2d (or 7c) is at this time energized.

The ratio of the gears in train 34 is calculated in relation to each cycle of disc 33 so that the discharge movement of each card may be arrested after the card has been further advanced from sensing position a predetermined distance sufficient to admit the next succeeding card while holding the preceding card in the feed to maintain the card-feed supervisory switches 2T, 2t, in operated condition.

Thus, the first card, involving the multiplier subcircuits, is sensed, advanced, and held momentarily before the succeeding card is fed downward. The relays 2v and 2x are held energized through closed contact 2T continuing contact 2y open and preventing grounding of conductors 2aa or 8a and 91c, thereby preventing false energization of relay 91.

Upon deenergization of the last of the multiplier relays (40p, 40q, 40r) involved in any such multiple-item release, stop coil 37 is deenergized and stop pawl 38 drops back to permit the stop disc 33 and associated card feed shaft section to resume rotation and complete the card transport and discharge. In this way, the release of a plurality of articles of the same kind from succeeding cards is automatically regulated to insure accuracy of count with minimized delay in the flow of order cards through the sensing units.

*Selecting channel for delivery of merchandise*

Relay 91, Fig. 5, upon energizing locks up through contacts 91a and 92a; contact 91b energizes relay 93; contact 93a energizes relay 94, which in turn energizes relay 97; contacts 93b are closed grounding conductor 93c, energizing motor-driven clutch 95, which causes cam 95a to raise lever arm 95c, opening retarding baffle plates 40b, allowing such articles as may have been discharged from the adjacent chutes above the baffle plates to fall onto baffle plates 40c.

At the beginning of the movement of cam 95b, contact 95d is closed, grounding conductor 92b, energizing relay 92, which opens contact 92a and grounds contact 92c; contact 92a, opening, releases relay 91 through contact 91a. Relay 91, releasing, opens contact 91b, freeing relay 93 from this source of energization. Cam 95b completes its revolution, contact 95d opens, relay 92 deenergizes, opening contact 92c, releasing through contact 92c and 93e the relay 93, and opening contact 93b to free clutch 95, which stops movement of cam 95c. The baffle plates 40b resume their closed positions due to the effort of spring means 95e.

Relay 93, releasing, also frees contact 93a from ground, placing relays 94 and 97 under control of relay 98. Relay 93, upon deenergizing, grounds contact 93d, which grounds contact 97a of energized relay 97, which energizes clutch 99 (Fig. 4), via conductor 97x, causing baffle plates 40c to operate as before described for plates 40b. The closing and opening of cam contacts 99a operates relay 98 as before described, releasing relays 94 and 97. Baffle plates 40c resume their closed position.

The energization of relay 97 grounds conductor 97b, energizing slow-to-release relay 100; relay 97 subsequently releases, as in the previous operation, thereby grounding contact 97c; but relay 100 holds up momentarily with contact 100a grounded, grounding conductor 100b, energizing relay 85 which opens contact 85b, releasing, through contact 83b, relay 83. Contact 83c is now grounded, grounding contact 84b, and conductor 84c, energizing relay 87, which in turn energizes relay 88. Relay 88 energizes relay 89. Contact 88a grounds conductor 88x, energizing motor-driven clutch 42a (Fig. 4), which, through the several gears, causes member 40d to take counter-clockwise motion, one-half revolution, and deposit in space 40e the articles released by the one or more cards of this (the first) card-feeding operation.

Cam 42b also takes motion with member 40d, closing contacts 42c and 42d; contact 42c grounds conductor 42e energizing relay 101, which releases relay 7 through contact 101a, conductor 88d, and contact 87a. Cam 42b completes its half revolution opening contact 42c, freeing conductor 42e from ground, which releases relay 101, opening contact 101c, freeing conductor 88b and contact 88c from ground, deenergizing relay 88. Contact 88a opens deenergizing clutch 42a: selector baffle 40d stops with its arms in a horizontal position.

At this point the No. 2 card feed stops, and the card feed No. 3 takes motion as will now be described.

On the movement of cam 42b, contact 42d is also grounded, grounding conductor 42f, energizing control relay 7 (Fig. 2), opening contact 7a, releasing relay 5b. Contact 5g opens, freeing conductor 5j from ground, deenergizing clutch 2d. Card feed No. 2 stops when cam 2p reaches its zero position and opens contact 2r.

At the beginning of this operation, it is recalled that both of the key switches 5a and 6a were closed, so that at this time relays 6b and 6d are energized. When cam 42b stops, contact 42d and conductor 42f are freed from ground; relay 7 deenergizes, contact 7b opens, releasing relay 5d, through contact 5n. Relay 5d is released, contact 5m grounds, grounding contacts 6c and 6f, which energizes magnetic clutch 7c for card feed No. 3, also charged with cards; the card picker takes motion with the same effect as described for feed No. 2, and the merchandise released by the cards falls on the baffle plates 40b, 40c, or selector baffle 40d (Fig. 4), as heretofore described, and the merchandise released by the second batch of cards will continue moving toward the point of delivery in the hereinafter described manner.

The travel of the merchandise released by the first batch of cards continues by reason of the facts that relay 101 is deenergized due to the opening of baffle cam contact 42c, and contact 101c (Fig. 5) is open, while contact 101a is closed, thereby placing relay 89 and its mate 90 under control of relay 101. Contact 101a is grounded, grounding conductor 88d and contact 89c; holding-relay 89 is energized, which in turn holds relay 90 energized.

Contact 88e grounds contact 90a, conductor 90b energizing motor-driven baffle clutch 41a (Fig. 4), which drives baffle 40g in counter-clockwise direction through the associated gearing, which in turn deposits the merchandise theretofore released by primary baffle 40d into compartment 40j. The merchandise is then moved forward by a constantly travelling motor-driven belt 40n toward a central point of delivery 66 (Fig. 6).

On the movement of selector baffle 40g, cam 41b also takes motion, closing contact 41c, grounding conductor 42e, again energizing relay 101 (Fig. 5), releasing hold relay 89; and on completion of movement of cam 41b contact 41c opens, releasing relay 101, which releases relay 90, opening contact 90a deenergizing clutch 41a, and stopping motion of selector baffle 40g.

*Printing identifying number*

The movement of member 40g, as aforesaid, also causes toothed wheels 62 and 63 of Fig. 6 (both of which are also mounted on shaft 67) to take counter-clockwise motion; wheel 62 will be effective in the operation now being described; contact 62b closes, completing a circuit from conductor 90c, 90c (Fig. 5) contacts 90a of energized relay to contact 62a, which is closed four times during the half-revolution of 62.

Each time contact 62a closes (Fig. 6) conductor 62c is grounded energizing stepping magnet 61d, once for each closing of contact 62a. The step switch wiper 61k is attached to the toothed step-up wheel to move with it, one step for each energization of magnet 61d.

The first step of 61k grounds contact 61g energizing magnet 60a, which attracts armature 60b; the energization of 60a is momentary; 60b is released and the printing hammer imparts a blow upward, printing the number character 60d on paper 60c.

Wiper 61k then advances to contact 61h, energizing the four magnets as 60e, advancing all numbering machines one digit.

Wiper 61k next advances to contact 61j energizing relay 69a, grounding contact 69b, energizing clutch 70a, which causes the motor-driven paper roller to take motion and advance the paper one space. Contact-closing cam 69c and toothed wheel 69d also take motion, closing contact 69e, which locks up relay 69a through contact 69g; relay 69a is held energized to insure a complete paper feeding operation by retaining ground on contact 69g until the operation is complete. Contact 69f energizes slow-to-release relay 69h, closing contact 69j, preparing for the paper cut-off operation.

Roller 70a and cam 69 completes a revolution and contact 69e opens; relay 69a releases, applying ground to contact 69k and contact 6CL of slow-to-release relay 69h, energizing momentarily the paper cut-off magnet 60m, which causes cutting tool 60f to operate and sever the paper bearing the printed character, with deposit of the resulting ticket at the merchandising receiving point 66 for chute 40j, for example.

*Release and delivery of successive orders*

Assuming that order cards have been successively handled by card feeds Nos. 2 and 3 and that the supply of cards in card feed No. 3 is now exhausted, relay 8 deenergizes as described for relay 2x, grounding conductor 8a, energizing relay 91 (Fig. 5) and its mates of the group A retard control unit to operate retarding baffle plates 40b and 40c once again in the manner previously described.

Following the second round of operation of said baffle plates, relay 97 (Fig. 5) releases, grounding contact 97c, which grounds conductor 100b (since the slow-to-release or trigger relay contacts 100a are delayed in opening), energizing master relay 85, releasing relay 86, grounding contacts 86a, 102a, and conductor 102b, thereby energizing the next pair of channeling relays 103 and 104.

Contact 104a grounds conductor 104b, energizing clutch 42g, causing primary selector baffle 40d to take clockwise motion for one-half revolution. Cam contact 42c then closes (Fig. 4), grounding conductor 42f, energizing relay 7 (Fig. 2), stopping motion of card feed No. 3 by releasing relay 6b, freeing contact 6c of ground, and thus opening the circuit of magnetic clutch 7c. Contact 42c opens when selector baffle 40d completes its movement, releasing relay 7, which in turn releases relay 6d in the same manner as described for relay 5d.

At the conclusion of the card feeding operation, as aforesaid, relays 8b and 8c (Fig. 2) operate as previously described, momentarily grounding conductors 8a and 91c, again energizing retard relay 91 (Fig. 5) and its mates for operating the retarding baffles in their next cycle of operation.

Another batch of cards now having been placed in card feed No 2, the latter is again ready to operate automatically upon stoppage of feed No. 3, and after a measured length of time following the feeding of the last card of the preceding batch, key 5a may be pressed for starting the next round of operations.

Baffle cam switch contact 42c, upon opening, frees conductor 42e of ground, thereby releasing the supervisory relay 101, which releases relay 104. The next pair of group C relays 105 and 106 are energized and deenergized in exactly the same manner as the preceding pairs 89—90, 103—104; and relay 106 grounds conductor 106b energizing clutch 42h (Fig. 4), which causes selector baffle 40h to take clockwise motion, now depositing the merchandise in chute 40L.

In the aforesaid clockwise motion of baffle 40h (Figs. 4 and 6) baffle cam 64 takes motion, operating the associated stepping switch 61c which in turn operates the corresponding mechanisms to print and cut off an identification ticket, as before described, depositing the ticket for this order in channel 40L.

In the following channeling operation, the relays of control groups A and B operate as before described. Intermediate relay 102x and its mate 102w energize channeling relay 107 in group C via conductor 107a, which in turn energizes relay 108, which in turn energizes relay 109 and its mate 109x in the manner before described. Relay 107 and its mate 108 ground conductor 88x, again energizing clutch 42a, causing primary baffle 40d to take counter-clockwise motion depositing this next order of merchandise on secondary baffle 40g. Relay 107 and its mate 108 subsequently release, as in previous cycles, so that when the primary baffle 40d completes its movement, card feed No. 2, which has been charged with cards, can be set in motion by pressing key 5a, as stated above, whereupon channeling relay 109 and its mate ground conductor 109a, energizing clutch 41d, causing baffle 40g to take clockwise motion depositing the merchandise thereon in channel 40k. Subsequent operations are repeated in accordance with the control pattern heretofore described.

In the next round of operation, for example, the next group of control relays beginning with relay 110 and its mate 110a, ultimately energizes channeling relays 111, 111a, which in turn energize channeling relay 112 and its mate 113. Relays 111 and 111a place ground on conductor 104b, again energizing clutch 42g, this time causing the primary selector baffle 40d to take counter-clockwise motion, depositing the merchandise on secondary selector baffle 40h. Relays 111 and 111a then release through operation of the baffle cam switch means, as in previous operations.

In the subsequent channeling operation, relay 112 and 113 are next energized, grounding conductor 112a, energizing clutch 42j, causing baffle member 40h to take counter-clockwise motion depositing the order of merchandise in delivery channel 40m.

At the conclusion of the last delivery operation, as aforesaid, circuits are set up to energize automatically the relays for another cycle of operations as follows:

Upon the energization of relay 113 in the last channeling operation of the preceding cycle, contact 113a is grounded from supervisory contact 82a, energizing slow-release supervisory relay 81. Relay 113 is now deenergized and relay 81 is held energized momentarily after the release of relay 113, so that contact 113b grounds contact 81a and conductor 81b, energizing relay 83 again, which in turn energizes its mate 84, setting up circuits in a chain manner to energize the intermediate selector relays 86, 102x, 110, and their mates, in accordance with the control pattern heretofore outlined, for another round of operations. Supervisory relay 81 then drops out, or deenergizes.

In order to release a plurality of articles of the same kind from a single stock compartment by a single impulse through a perforation in a card, the number of articles to be released is first determined; if two articles are desired multiplier switches 40t and 40u (Fig. 4) are manually closed; if three articles are required switches 40s, 40t, and 40u are closed.

Each of the last-mentioned multiplier switches controls a slow-to-release relay as 40p, which releases in a measured length of time after its circuit is opened. Relay 40p, energizing, energizes relay 40q; relay 40q energizes relay 40r. The time interval between the releasing of one of these relays and the next is sufficient to permit the release of a single article of merchandise following any previously released, as aforesaid.

For example: assuming that three articles are to be released, switches 40s, 40t, and 40u are closed; conductor 40v is grounded by an order card (e. g. in the manner described for the adjoining conductor 4c to the goods-release coil 40a) and magnet 40aa is energized, releasing one article of merchandise; relay 40p is also energized, grounding contact 40w which energizes relay 40q, which in turn, through contact 40y, energizes relay 40r.

Relay 40p released (grounding contact 40x), which in turn grounds contact 40y, grounding conductor 40v, energizing magnet 40aa again, thereby effecting release of the second article of merchandise. Relay 40q releases and, through the closed contact 40z of relay 40r, magnet 40aa is again energized, relasing the third article of merchandise, and so-on, it being understood that the aforesaid multiple article release means may be expanded as desired.

Should two (or more) successive cards call for the identical goods and any immediately preceding card be ordered for a multiplicity of said articles, as determined by operation of the multiplier subcircuit controlled by relays 40p, 40q, 40r, under control of the stop circuit means 31, 33, 35, 37 (Figs. 2 and 4) heretofore detailed, the following card will not be advanced until the last article called for by the preceding card has been released and the card emitted.

Without this regulating feature or card-holding means, a second or following card, if a duplicate of the first card, might reenergize the first multiplying relay 40p before the second relay 40q or the third relay 40r has released, thereby effecting an incorrect count.

It will appear from the foregoing illustrative description that the system affords economies in operating equipment by reason of a multi-channel delivery means utilizing a single conveyor common to all goods stock compartments.

Moreover, the order card sensing and release means is simplified and is flexible for expansion by addition of card feeding units as necessary to meet the load demands of stores of various size.

The automatic goods-baffle mechanism expands the capacity of the system for utilization of vertical storage space for any given floor area.

The foregoing, and other detailed advantages of this system afford reduced initial equipment (as well as operating and maintainance) costs over prior types of card-controlled merchandising systems which involve highly complex selecting mechanism not suitable to small installations, and not particularly adapted to flexibility for alteration to discriminate between the relatively slow-moving and the more popular items of merchandise, as is possible with the present system and its automatically sequential card-feed means; the automatic channeling mechanism, and associated automatic retarding baffle means.

I claim:

1. In a mechanized merchandising system, the combination with means for stocking items of merchandise at an elevation relative to a conveyor for gravitation onto the latter, and electromagnetic release means operable to free said items for movement one at a time onto said conveyor of the following, namely: selective release-operating means comprising a plurality of motor-feeds for cards each perforated to correspond to a stocked item, operator-initiated means for actuating said feeds selectively to effect feeding said cards one at a time sequentially into a sensing position, plural perforation-sensing means for each feeding means and circuit apparatus actuated thereby automatically operable to close a selecting circuit to a corresponding release means when said cards are in sensing position, means defining a plurality of channels on said conveyor, motor-driven selector baffle means operable to direct released goods to any of said channels, and selecting circuits actuated under control of said release operating means for determining the sequential order of operation of said selector baffle means, whereby the released goods are directed to certain conveyor channels in a certain order.

2. In a merchandising system, the combination with means for storing a variety of goods for gravitating descent to a conveyor, and electromagnetic release means for each variety of goods of the following, namely: key-controlled means for feeding perforate order cards into a sensing position, perforation-sensing means and circuit connections established thereby to said electromagnetic release means for releasing goods to any corresponding sensed card perforation, retarding baffle means interposed in the path of goods descending toward said conveyor, a primary selector baffle interposed in the path of goods between said retarding baffle means and conveyor, means defining channels in said conveyor, secondary selector baffle means for each conveyor channel and interposed between the latter and said primary selector means, electrical mechanism for selectively effecting operations of said primary and secondary baffle means to direct goods in various conveyor channels, and circuit control means actuated under control of said sensing means and said baffle means for operating said retarding baffles, and said primary and secondary baffle means in a predetermined order to direct card-released goods into certain conveyor channels in a predetermined channeling pattern.

3. Apparatus as set forth in claim 2 and further characterized by the provision of electromagnetic claim-ticket imprinting and severing means associated with each said selector baffle and the conveyor channels served thereby, and circuit means controlled by each said secondary baffle means, responsive to goods-releasing operation thereof, for automatically actuating the corresponding imprinting and severing means to discharge an identification ticket into the corresponding channel.

4. In a mechanized merchandising system of the type including a belt conveyor, goods compartments at an elevation to said conveyor, electromagnetic goods reelase means for each said compartment and operable to release goods items one at a time for gravitation onto said conveyor, release circuit means for actuating any said release means, perforate-card circuit selecting means for actuating any said release circuit means corresponding to predetermined card perforations, improvements comprising: a plurality of said perforate-card circuit selecting means and a motor-driven card feed associated with each of the same, together with operator-actuated starting switch means for each said feed, and a sequence circuit associated with each said feed and operating automatically to control operation of said feeds one at a time in a predetermined sequence provided the corresponding said starting switches are operated.

5. In an electrical merchandising system operated by perforate cards to effect gravitating release of goods in correspondence with perforations in the cards, a plurality of motor-driven card feeds, operator-controlled switch means for conditioning each said feed for operation, and a sequence circuit operating to effect sequential-actuation of one said feed following feeding of the last card from another said feed.

6. In an electrical merchanidising system of the type effecting release of packaged items under control of an eltctrically operable goods selecting mechanism, improvements comprising, to wit: a belt conveyor, common to all goods selecting mechanisms and conveying goods to a central delivery counter, means defining separate channels on said conveyor, a plurality of oscillable selector baffles interposed in the path of goods moving into said channels, motor means for turning said baffles in opposite directions to discharge goods into different channels, and selecting relay means connected to control said motor means to effect cyclic operation of said baffles directionally and sequentially deflecting goods into each said channel until each channel has been served, the said cycle of operation thereafter being repeated.

7. In an electrical merchandising system of the class described, in combination, a conveyor adapted to receive goods released from storage compartments, means defining a plurality of goods channels on said conveyor, selector baffles rotatable to divert released goods into desired channels, motor drive means for said baffles and including electromagnetic clutch means for each baffle drivingly interconnecting the latter with said motor means for rocking the baffle to divert goods into one or another channel, and a control circuit for actuating said clutch means selectively.

8. Apparatus as set forth in claim 7 and further characterized by the provision therein of sequence relay means in said circuit operable to effect a cyclic operation of said clutch means in a predetermined sequence for diverting goods selectively to said channels in a certain order.

9. Apparatus as set forth in claim 8 and further characterized by the provision therein of identification ticket imprinting and severing means associated with each said channel, a number type wheel for each said imprinting means, electromagnetic type wheel advancing means, a control circuit for each said imprinting and severing means and actuated cooperatively with the corresponding baffle control circuit means to imprint and sever an identification ticket for deposit in the corresponding channel following each corresponding operation of said baffle means, and circuit means automatically actuated under control of said imprinting control circuit following each said imprinting operation for automatically actuating all said type-wheel advancing means to move the several type wheels to the next identification number.

10. In a dispensing machine controlled by selecting circuits set up through perforate order cards, the combination with an order card feeding mechanism, of a conveyor having a plurality of channels thereon, a plurality of selector baffles and operating means for each baffle to turn the same variously in opposite directions to guide dispensed items into a desired one of said channels, and circuit means cooperable with said card feeding mechanism for actuating said baffle operating means in a certain sequence and order following each card feeding operation.

11. In a merchandise dispensing system, a multi-channel conveyor traveling past a supply of releasable items to a delivery station and means for selectively releasing items of merchandise into the channels thereof, order identification means comprising ticket imprinting mechanism operatively associated with each said channel, said mechanisms each being operable to imprint and release an identification ticket into the corresponding channel, each said mechanism having changeable type means for printing said tickets, and mechanism operatively controlled by said releasing means and effecting a change of type for each said imprinting mechanism coincidentally with each release of merchandise to any said channel.

12. In a merchandise dispensing system, the combination with a common conveyor and electrically controlled means for releasing any of a diversity of items of merchandise for movement onto said conveyor, of means dividing said conveyor into a plurality of channels, circuit means actuated under control of perforated order cards for operating said electrically controlled means to release one or a plurality of like items for movement onto said conveyor, and mechanism coacting with said circuit means for directing said released items selectively into said channels in a predetermined order of channel selection.

13. In a merchandising system, in cooperative combination, electrically controlled means for releasing any of a diversity of stock items for movement onto a conveyor, a constantly travelling conveyor, means partitioning said conveyor into a plurality of channels, and rotatable baffle mechanism actuated automatically and cooperatively with said releasing means for selectively diverting released items of merchandise into said channels in a predetermined sequence of channel selection and in a series of interrupted movements toward the selected channel.

14. In a mechanized merchandising system of the class described, in combination, a constantly travelling conveyor moving along a horizontal path, means for stocking items of diversified merchandise at an elevation above said conveyor and at points along its path of travel, electrical release means controlled by perforated cards for releasing desired items for movement onto said conveyor, means defining a plurality of channels on said conveyor along the substantial extent of its travel, and baffle means actuated cooperatively with said release means for controlling the movement of released items in a plurality of intermittent steps into a desired channel.

15. Apparatus as set forth in claim 14 and further characterized by the provision of multiplier circuit means cooperable with said electrical release means for effecting release of a plurality of items of the same kind under control of a single perforate card and for controlling operation of said baffle means to divert all items of the same kind released as aforesaid into the same channel.

16. In a merchandising system, in combination, a horizontally travelling conveyor, means for storing items of merchandise of different kinds at an elevation above said conveyor and at various positions along the path of travel, electrically controlled means for releasing items of each kind one at a time for gravitation onto said conveyor, circuit means controlled by a sensing device for selectively actuating said release means and an item multiplying circuit manually settable for cooperation with the sensing device for multiplying the number of items of one kind released by the selecting action of said sensing device by a single sensing operation.

17. In an article dispensing apparatus, a horizontally travelling conveyor, means including electrically actuated release devices for releasably storing articles at an elevation along the path of said conveyor, selector circuit means controlled by perforated cards for actuating said release devices selectively, a plurality of retarding baffles interposed in the path of released articles moving toward said conveyor, motor means operable to open and close said baffles, and baffle control means including retard relay circuit means connected for control by said selector circuit means to open and close said retarding baffles in a predetermined sequence folowing each operation of any said release device.

18. Apparatus in accordance with claim 17 and further characterized by the provision of means defining channels on said conveyor, and electrically actuated selector baffle means and operating circuits therefor operable to direct articles selectively into said channels, together with channel-selection circuit means selectively conditioning said selector baffle circuits for operation, and switch means for energizing said selector baffle circuits and controlled dependently upon operation of said retard baffles for actuating said selector baffle means.

19. In an article dispensing apparatus of the class described, the combination with electrically controlled mechanism for selectively releasing stored articles one at a time for gravitating movement onto a horizontally travelling conveyor at different points along its length, of means dividing said conveyor into channels, retard baffles at different elevations above said conveyor for arresting downward movement of released articles, selector baffles below said retard baffles and operable to direct articles gravitating from the last of said retard baffles into desired channels, and master circuit means operable to actuate said releasing mechanism, said retard baffles and said selector baffles in the order named, said master circuit means including channel-selecting sub-circuits for cyclically repeating the order of channel selection so as to serve each of said channels with orders of released articles in succession.

20. Apparatus as set forth in claim 19 and further characterized by the provision of multiplier sub-circuit connections cooperable with said article-releasing mechanism for effecting release of a plurality of articles of one kind, and delay circuit means cooperable with said multiplier sub-circuit connections and said master circuit means to delay operation of said retard and selector baffles until the last of the plurality of articles is released as aforesaid.

21. In an electro-mechanical merchandising mechanism having an electrically controlled feed for perforate order cards, and card-perforation sensing means to set up goods-release circuits for releasing articles one at a time, the combination of multiple- article-release sub-circuit means including switches settable to determine the number of articles to be released from a given sensing operation, means part of said feed for moving a card into sensing position relative to said sensing means, circuit means controlled by a card in the feed for automatically arresting the feeding thereof at sensing position, circuit means cooperable with said subcircuit means for effecting resumption of said feeding to effect movement of a sensed card to discharge position, means controlled by said subcircuit means when the latter is operated for multiple-article release for automatically stopping the feeding of a sensed card in the feed a second time before reaching discharge position, and circuit means controlled by said subcircuit means for effecting a resumption of the feeding of a card, stopped as aforesaid at the second position, responsive to the operation of said goods-release circuits in releasing the last of a plurality of articles released thereby under control of said multiplier subcircuit means.

22. In a merchandising mechanism, in combination, goods release circuits controlled by circuit sensing means actuated by perforate order cards, means for feeding cards into sensing position relative to said sensing means, circuit means controlled by a card at sensing position to stop said feed, circuit means cooperable with said feed for automatically effecting resumption of operation of the feed to move a card from sensing to discharge position after elapse of a determined time interval during which said sensing means can actuate a sensed release circuit and effect release of the goods.

23. Mechanism in accordance with claim 22 and further characterized by the provision of multiplier subcircuits selectively cooperable with said goods release circuits for effecting release of a plurality of articles of the same kind, and means controlled by said subcircuit means for interrupting operation of said card feeding means following said resumption of operation thereof and before discharge of a sensed card, until the last of a plurality of goods articles is released under control of said subcircuit means.

24. Apparatus in accordance with claim 22 and further characterized by the provision of a plurality of said card feeding means each adapted to be pre-loaded with a multiplicity of order cards, and an operator's control circuit having connections with all said feeding means and operator's key switches selectively operable to initiate operation of any one of said feeding means followed by automatic operation of another and succeeding one of said feeding means following discharge of the last card from the preceding feeding means, whereby a sequentially tandem operation of card feeds is provided.

25. In an electrically controlled merchandising system, means for feeding perforate order cards into and out of sensing position, means for sensing said cards to actuate article-release means according to the perforations, subcircuit means selectively actuated by an operator to multiply the number of articles of one kind released by said release means, operator-controlled means for initiating operation of said feeding means, card-controlled means for automatically and momentarily stopping said feeding means with a card in sensing position, and thereafter discharging said card, and circuit means coacting with said subcircuit means for stopping said card a second time between sensing and discharge positions for a preedtermined time dependent upon the number of article-releasing operations effected by said subcircuit means.

26. In an electric mechandising machine, in combination with electrically operated good-release means, a card feed for perforate order cards, and release circuits for said release means set up selectively by feeler means operating in accordance with perforations in cards fed into sensing position by said feed, multiplier control means comprising: multiplying subcircuits and selective multiplier operating switch means therefor operable for connection with any selected release circuit to multiply the number of operations thereof to release a plurality of goods articles of the same kind, and duplicate card-feed control means including circuit means actuated responsive to operation of any said multiplier switch means modifying the operation of said card feed to delay the sensing of a following card in said feed until the last of the several articles called for by the preceding card has been released by said release means.

27. In an electric merchandising machine, in cooperative combination, article releasing circuits, a card feed operable to receive perforate order cards and move same into sensing position and discharge cards from sensing position, sensing means cooperable with perforate order cards in said sensing position to set up operating circuits for said releasing circuits, a multi-channel delivery conveyor receiving released articles, channeling means operable to selectively guide released articles into desired channels, multiplier subcircuits selectively operable for connection into any sensed release circuit to effect release of more than one article of the same kind, circuit means controlled by discharge movement of a card from said feed for actuating said channeling means to guide a released article into a predetermined channel on said conveyor, and circuit means actuated cooperably with actuation of any said multiplier subcircuit for modifying the operation of said card feed to delay discharge of a sensed card and prevent operation of said channeling means until the last article of a series, corresponding to the subcircuit involved, has been released by said release means.

28. In a card-controlled merchandise dispensing machine, merchandise conveying channels, including conveying means therefore traveling past releasably stored items of merchandise to a delivery point, means for releasing said items of merchandise selectively into selected channels, means for discharging an identifying ticket into any channel into which an item of merchandise is released as aforesaid, and card-sensing circuit-selecting and actuating means controlling said releasing means and said ticket discharging means for operation in the order named.

29. In a mechanized merchandising system, a horizontally travelling conveyor, opposite wall members above said conveyor and flanking said conveyor and pitched in a convergent sense toward each other at their upper edges, merchandise compartments on said wall members and opening toward said conveyor, goods-releasing means for said compartments, means near the lowermost compartments for guiding released goods toward said conveyor, a plurality of normally closed goods baffles interposed at different vertical levels in the path of descent of released goods moving toward said conveyor from said compartments, and electrically-actuated means including a control therefor for opening a predetermined number of said baffles in a predetermined order beginning with an uppermost one of said baffles and ending with a lower one thereof above said conveyor.

30. Apparatus as set forth in claim 29 and further characterized by the provision therein of partition means dividing said conveyor into a plurality of goods compartments in the direction of its travel, and certain of said baffles are arranged above said channels in superposed relation for directed movements from a normal goods-supporting position to different goods-discharging positions, and mechanisms for selectively directing said goods-discharging movements of said certain baffles to effect discharge of released goods into selected channels.

31. In a mechanized merchandising system, a goods conveyor; means providing goods compartments at an elevation from said conveyor; electrically-actuated goods release means for said compartments and selectively operable to release goods items for gravitation onto said conveyor; release-circuit means for selectively actuating any said release means; perforate-card controlled circuit-selection means for actuating said release circuit means selectively in accordance with predetermined perforations in a control card used in said card-controlled means; and goods-retarding baffle means interposed at different elevations in the path of movement of released goods toward said conveyor; together with baffle-actuating means operating under control of said card-controlled circuit-selecting means in goods-releasing operation thereof to retard the gravitating movement of goods onto said conveyor.

32. Apparatus as set forth in claim 31 and further characterized by the provision therein of means defining a plurality of separate goods channels on said conveyor, primary and secondary selecting baffles interposed between said retarding baffle and said channels and operable to direct released goods into any said channel, together with channel-selecting circuit means cooperative with said card-circuit selecting means and said retarding baffle actuating mechanism to direct goods into a different one of said channels following each operation of said retarding baffle means until each said channel has been served with goods, and thereafter to repeat cyclically said goods-directing operation.

33. In an electrically-actuated goods dispensing system including selector means for releasing goods items from storage compartments for conveyance to a delivery point, improvements comprising, to wit: a continuously traveling conveyor means common to all said storage compartments for receiving released goods items therefrom and leading to a predetermined delivery station; means defining a plurality of separated order channels in said conveyor means, said channels likewise being common to all said compartments to receive goods items released from any of the same; a plurality of selectively movable goods-guiding members interposed between said compartments and said conveyor channels; electrically-actuated control means for selectively moving said goods-guiding members to direct released goods items into selected ones of said conveyor channels; and circuit means for operating said last-mentioned controls means selectively as aforesaid.

34. In an electrical merchandising system of the class described, in combination, goods-storage compartments and conveyor means situated in common relative thereto to receive goods released from any compartment; order-segregating means for said conveyor means and dividing the latter into a plurality of channels all of which are common relative to said compartments; selectively movable baffle means interposed in the path of movement of goods items released from said compartment and moving toward said conveyor means and any said channel; and mechanism operable to move said baffle means for selectively predetermining the path of travel of released goods items relative to said channels.

35. An electrically controlled merchandising apparatus including, in cooperative combination: means for sequentially sensing order control cards each having sensible control data thereon corresponding to one or more goods items to be released and delivered to a distributing station; means for releasably storing goods items for movement onto a conveying device; electrically controlled release means for the several items of goods in said storing means; conveyor means traveling in relation to said goods storage means and leading to a delivery station; release-circuit means controlled by said sensing means for selectively actuating said release means to release desired goods items to said conveyor means; goods-segregating means operatively associated with said conveyor means for separating released goods items conveyed thereby in predetermined order groups for the duration of conveyance to said delivery station; goods-guiding means including a plurality of selectively movable guiding devices interposed between said storage means and said conveyor means and operable to direct released items relative to said segregating means into different order groups, as aforesaid; circuit means cooperable with said sensing means and controlled by the latter for moving said guiding devices to change the order-grouping action thereof each time a different order card is sensed, as aforesaid.

36. Apparatus as set forth in claim 35 and further characterized by the provision therein of electrically-controlled ticket-issuing means situated relative to said conveyor means for operation to deliver an order-identifying ticket into any order group determined by said segregating means; and circuit means cooperatively controlled with said sensing means for actuating the ticket-issuing means as aforesaid.

CLYDE SMITH.

References Cited in the file of this patent

UNITED STATES PATENTS

| Number | Name | Date |
|---|---|---|
| 1,829,140 | Hitchman | Oct. 27, 1931 |
| 2,276,293 | Farmer | Mar. 17, 1942 |
| 2,315,659 | Russell | Apr. 6, 1943 |
| 2,353,002 | Ambruster | July 4, 1944 |
| 2,355,708 | Delucchi et al. | Aug. 15, 1944 |
| 2,374,537 | Goldsmith | Apr. 24, 1945 |
| 2,540,241 | Brand | Feb. 6, 1951 |
| 2,570,918 | Chodziesner | Oct. 9, 1951 |
| 2,584,628 | Skillman | Feb. 5, 1952 |